(12) United States Patent
O'Donnell et al.

(10) Patent No.: US 8,547,378 B2
(45) Date of Patent: Oct. 1, 2013

(54) TIME-BASED DEGRADATION OF IMAGES USING A GPU

(75) Inventors: Daniel O'Donnell, Port Townsend, WA (US); John G. Carscadden, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1097 days.

(21) Appl. No.: 12/200,323

(22) Filed: Aug. 28, 2008

(65) Prior Publication Data

US 2013/0120388 A1 May 16, 2013

(51) Int. Cl.
*G06T 17/00* (2006.01)

(52) U.S. Cl.
USPC .............................. 345/428; 345/545; 345/698

(58) Field of Classification Search
USPC .......................................... 345/428, 545, 698
See application file for complete search history.

(56) References Cited

U.S. PATENT DOCUMENTS

| | | | |
|---|---|---|---|
| 5,986,663 A | 11/1999 | Wilde | |
| 5,999,189 A | 12/1999 | Kajiya et al. | |
| 6,075,513 A | 6/2000 | Reddy et al. | |
| 6,975,319 B1 | 12/2005 | Donovan et al. | |
| 7,126,604 B1 | 10/2006 | Purcell et al. | |
| 7,412,099 B2 | 8/2008 | D'Ortenzio et al. | |
| 7,801,221 B2 | 9/2010 | Montard et al. | |
| 2005/0254106 A9* | 11/2005 | Silverbrook et al. | 358/539 |
| 2005/0271361 A1* | 12/2005 | Aoki et al. | 386/68 |
| 2006/0267991 A1* | 11/2006 | Preetham et al. | 345/502 |
| 2008/0024495 A1* | 1/2008 | Mech et al. | 345/426 |
| 2008/0076546 A1* | 3/2008 | Moyle et al. | 463/29 |

* cited by examiner

*Primary Examiner* — Maurice L McDowell, Jr.
(74) *Attorney, Agent, or Firm* — Wolfe-SBMC

(57) ABSTRACT

A method, system, and computer-readable storage medium are disclosed for time-based degradation of images. In one embodiment, the rendering of a first frame of a digital video using a GPU may be initiated. In one embodiment, it may be determined that a time elapsed in rendering the first frame exceeds a threshold. In one embodiment, a downsampling factor may be determined in response to determining that the time elapsed exceeds the threshold. In one embodiment, a second frame of the digital video comprising a second set of one or more images may be rendered based on the downsampling factor using the GPU. Rendering the second frame based on the downsampling factor may comprise sending each of the second set of images to the GPU at a reduced resolution comprising a respective original resolution for each image divided by the downsampling factor.

30 Claims, 7 Drawing Sheets

TIME-BASED DEGRADATION OF IMAGES USING A GPU

BACKGROUND

1. Field of the Invention

The present invention is directed to computer systems; and more particularly, it is directed to the display of images in a video sequence using computer systems.

2. Description of the Related Art

As the power and complexity of personal computer systems increase, graphics operations are increasingly being performed using dedicated graphics rendering devices referred to as graphics processing units (GPUs). As used herein, the terms "graphics processing unit" and "graphics processor" are used interchangeably. GPUs are often used in removable graphics cards that are coupled to a motherboard via a standardized bus (e.g., AGP, PCI, or PCI Express). GPUs may also be used in game consoles and in integrated graphics solutions (e.g., for use in some portable computers and lower-cost desktop computers). Although GPUs vary in their capabilities, they may typically be used to perform such tasks as rendering of two-dimensional (2D) graphical data, rendering of three-dimensional (3D) graphical data, accelerated rendering of graphical user interface (GUI) display elements, and digital video playback. A GPU may implement one or more application programmer interfaces (APIs) that permit programmers to invoke the functionality of the GPU.

To reduce demands on central processing units (CPUs) of computer systems, GPUs may be tasked with performing operations that would otherwise contribute to the CPU load. Accordingly, modern GPUs are typically implemented with specialized features for efficient performance of common graphics operations. For example, a GPU often includes a plurality of execution channels that can be used simultaneously for highly parallel processing. A GPU may include various built-in and configurable structures for rendering digital images to an imaging device.

Digital images may include raster graphics, vector graphics, or a combination thereof. Vector graphics data may be stored and manipulated as one or more geometric objects built with geometric primitives. The geometric primitives (e.g., points, lines, polygons, Bézier curves, and text characters) may be based upon mathematical equations to represent parts of digital images. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values.

Digital video may include such digital images. For example, a digital video sequence may include a plurality of frames. Each frame may include one or more digital images. Each of the digital images in a frame may include transparency information which is used to determine how the images are combined in the frame. A digital video editing program such as a video compositing application may be used to create and edit a digital video sequence.

SUMMARY

Various embodiments of systems, methods, and computer-readable storage media for time-based degradation of images are disclosed. The rendering of a first frame of a digital video using a graphics processing unit (GPU) may be initiated. The first frame may comprise a first set of one or more images. It may be determined that a time elapsed in rendering the first frame exceeds a threshold. The threshold may be exceeded before all of the first set of images are rendered. A downsampling factor may be determined in response to determining that the time elapsed in rendering the first frame exceeds the threshold.

Subsequent to the rendering of the first frame, a second frame of the digital video may be rendered based on the downsampling factor using the GPU. The second frame may comprise a second set of one or more images, and each of the second set of one or more images may have a respective original resolution. Rendering the second frame of the digital video based on the downsampling factor may comprise sending each of the second set of one or more images to the GPU at a reduced resolution. The reduced resolution may comprise the respective original resolution for each image divided by the downsampling factor. In one embodiment, the first frame of the digital video may also be rendered at the downsampling factor prior to rendering the second frame.

In one embodiment, each of the second set of one or more images may be stored at the reduced resolution in a memory of the GPU. The stored images may be retrieved from the memory of the GPU in response to receiving an instruction to redisplay the second frame of the digital video.

Figure 1:
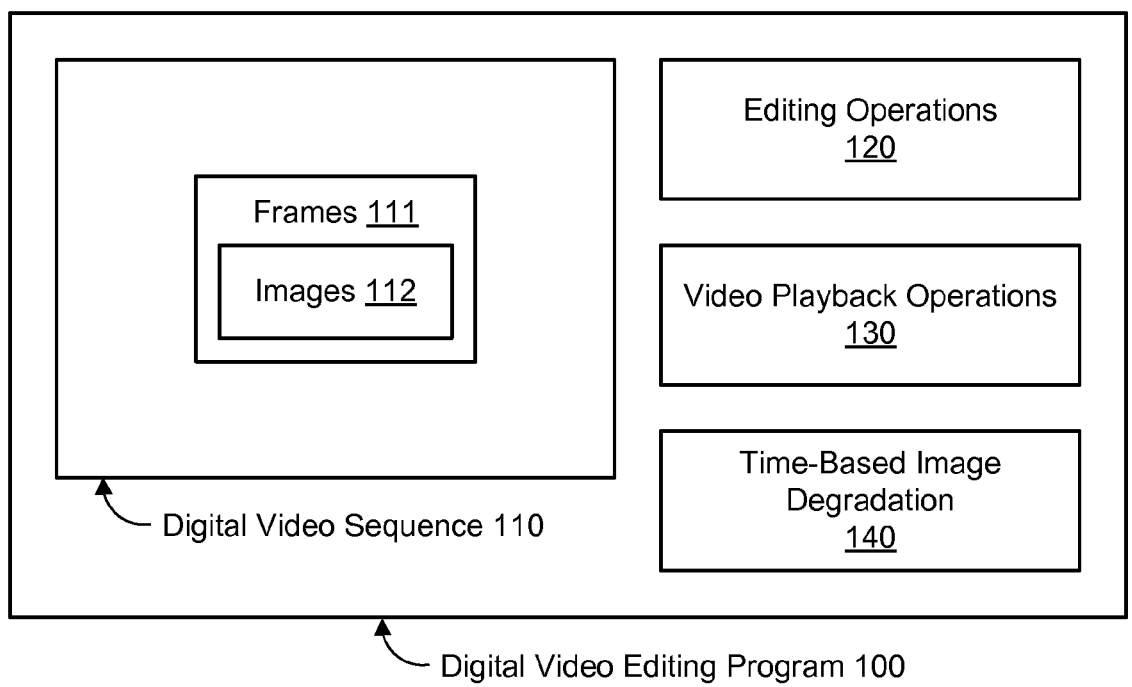
FIG. 1 is a block diagram illustrating an embodiment of a digital video editing program configured for time-based image degradation.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Using embodiments of the systems and methods described herein, images in a digital video sequence may be downsampled if frames of the video are not rendered sufficiently fast at the original resolution. In one embodiment, a downsampling factor for images may be determined and maintained from frame to frame during user interactions such as a scrub. In this manner, the pace of the display of rendered frames may substantially match the pace of user interaction requiring rapid updates.

Figure 2:
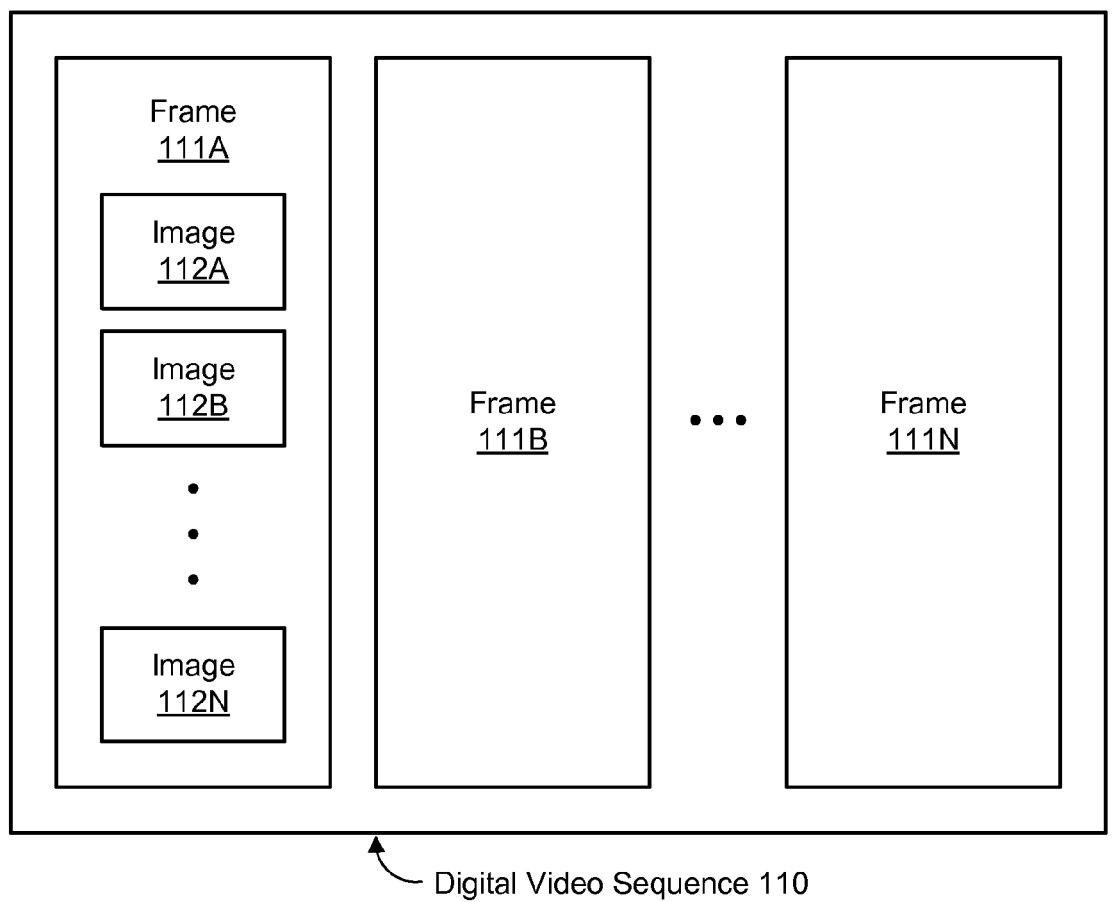
FIG. 2 illustrates a digital video sequence according to one embodiment.

FIG. 1 is a block diagram illustrating an embodiment of a digital video editing program 100 configured for time-based degradation of images. A digital video editing program 100, also referred to herein as a video compositing application 100 or a video editor 100, may be used to create and/or modify a digital video sequence 110, also referred to herein as video 110. The digital video sequence 110 may include a plurality of frames 111 ordered by frame time within the sequence. As shown in FIG. 2, an example of a digital video sequence 110 may include a plurality of individual frames 111A and 111B-111N. Each frame 111 may include one or more digital images 112. As shown in FIG. 2, the example frame 111A may include a plurality of individual images 112A and 112B-112N. The images 112 within a frame 111 may overlap. Each of the images 112 in a frame 111 may include transparency information which is usable to determine how the various images 112 are composited within a single frame 111. Thus, in one embodiment, the images 112 may comprise layers within a frame 111. A frame may also be referred to herein as a scene.

Returning to FIG. 1, the digital video editing program 100 may comprise a plurality of editing operations 120. The editing operations 120 may comprise suitable operations for modifying elements of the video 110. For example, various effects such as filters (e.g., Gaussian blur, median filter, add noise, reduce noise, fragment, unsharp mask), image adjustments (e.g., levels, curves, brightness/contrast, shadow/highlight), and other operations (e.g., resizing, cropping, thresholding, rotation, perspective distortion) may be applied to one or more frames, images, selections within a frame or image, or other suitable elements of the digital video sequence 110. The editing operations 120 may comprise suitable operations for creating new frames, deleting frames, and modifying the order of frames within the sequence 110. In one embodiment, a suitable product such as Adobe AfterEffects® (available from Adobe Systems, Inc.) may be used as the video editor 100.

The digital video editing program 100 may also comprise one or more video playback operations 130. For example, video playback operations 130 may include suitable controls in a user interface (e.g., a graphical user interface or GUI) that permit a user to play all or part of the digital video sequence 110 in forward or reverse order at various speeds. In one embodiment, the video playback operations 130 may include a facility that permits the user to "scrub" the video 110. As used herein, "scrubbing" the video 110 may comprise updating a current frame time of the video 110. For example, by scrubbing the video 110 to move a time needle or otherwise change the current frame time, the user may instruct the video editor 100 to update the displayed frame to match the current frame time as modified by the scrub operation. In one embodiment, the user may scrub the video 110 by performing a particular mouse operation such as holding down a particular mouse button while moving the mouse in a particular direction (e.g., "click and drag") while interacting with an element in the GUI. The direction of the mouse motion may indicate whether the current frame time is decreased or increased. In one embodiment, the frame displayed in the video editor 100 may be updated again and again as long as the current frame time is being modified again and again by the scrub operation. The end of a scrub may be determined by a "mouse up" input after the user ceases the appropriate mouse activity (e.g., click-and-drag).

Figure 3:
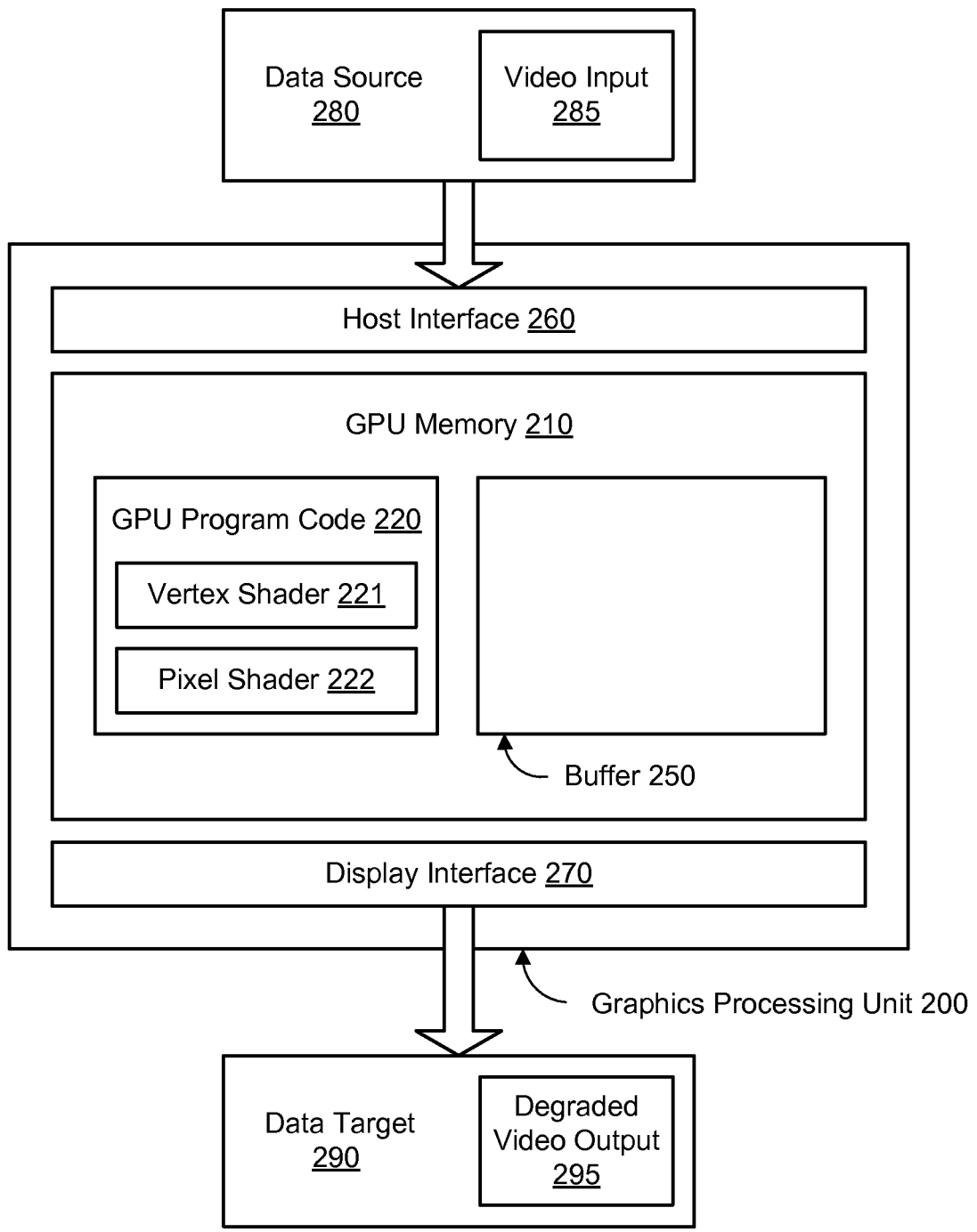
FIG. 3 is a block diagram illustrating one embodiment of a graphics processing unit (GPU) configured to render degraded video according to the techniques described herein.

In one embodiment, updating the frame displayed in the video editor 100 in response to a scrub may comprise rendering that frame using its constituent images. In one embodiment, frames 111 may be rendered using a graphics processing unit (GPU) 200 as illustrated in FIG. 3. For frames that are sufficiently large (e.g., frames having a large number of pixels with floating-point color values) or complex (e.g., frames having a large number of images), the hardware and/or software facilities for rendering the frames may lack the computational resources to render each frame fully and in real time as the user updates the current frame time. In one embodiment, for example, a need to transfer image data from the memory of a host system to the GPU may pose a bottleneck to dynamic, real-time updating of the current frame in response to user interaction demanding rapid updates.

The digital video editing program 100 may comprise instructions to implement time-based image degradation functionality 140. As will be described in greater detail below, frames 111 in a digital video sequence may be degraded in quality if the frames 111 cannot be rendered sufficiently fast. In this manner, the pace of the display of rendered frames may substantially match the pace of user interaction (e.g., a scrub) requiring updates to the display.

Figure 6:
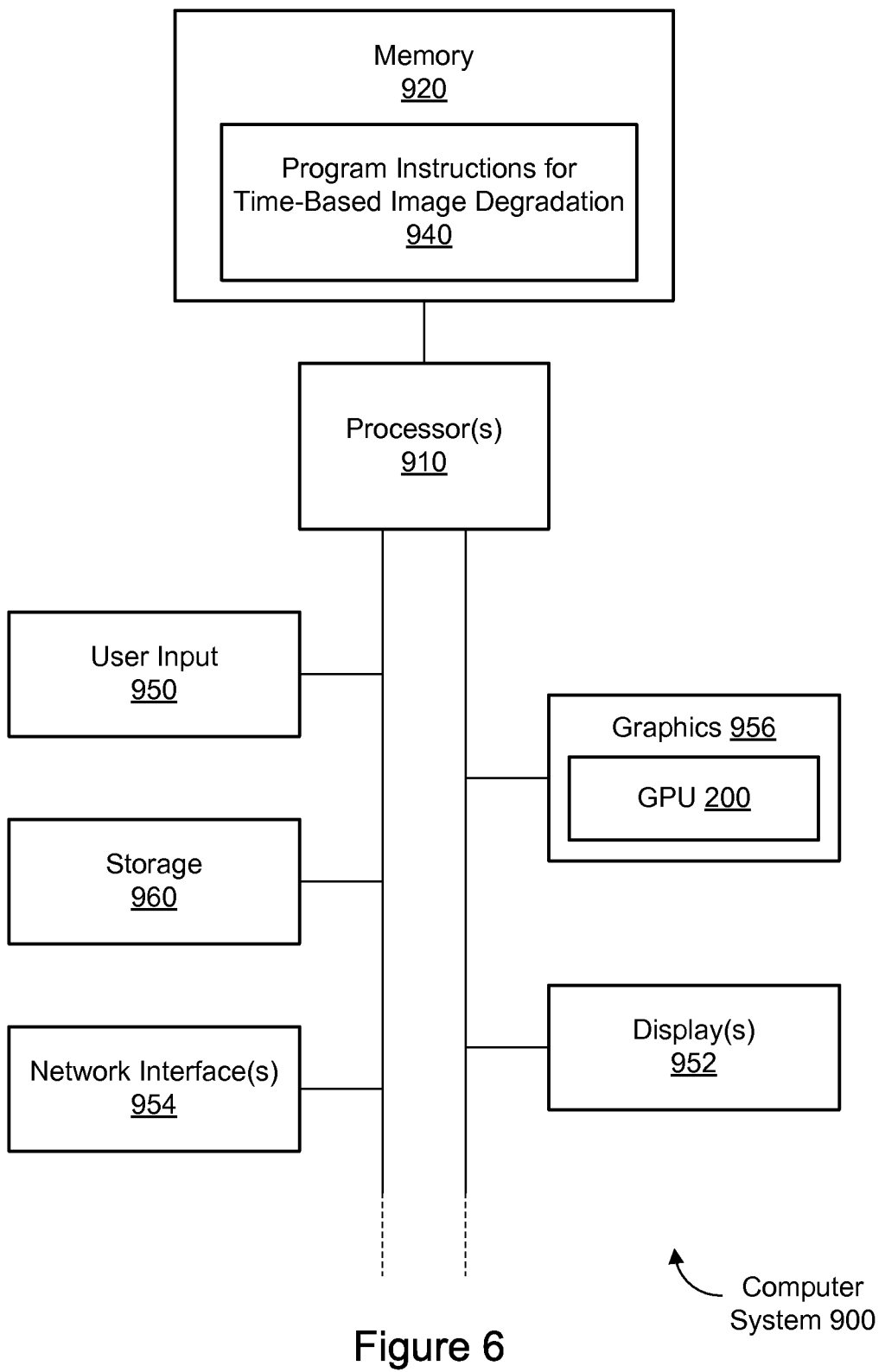
FIG. 6 is a block diagram illustrating constituent elements of a computer system that is configured to implement embodiments of the system and methods for time-based image degradation.

The editing operations 120, video playback operations 130, and time-based image degradation functionality 140 may comprise program instructions that may be executed in association with the video editor 100. In various embodiments, the program instructions that implement the editing operations 120, the video playback operations 130, and the time-based image degradation functionality 140 may be coded as an intrinsic part of the video editor 100 or as a plug-in module or other extension to the video editor 100. The video editor 100 and its constituent elements and data may be stored in a memory 920 of a computer system 900 as illustrated in FIG. 6.

FIG. 3 is a block diagram illustrating one embodiment of a GPU 200 configured to render video 110 according to the techniques described herein. The GPU 200, also referred to herein as a graphics processor, may comprise a dedicated graphics rendering device associated with a computer system. An example of a suitable computer system 900 for use with a GPU is illustrated in FIG. 6. Turning back to FIG. 3, the GPU 200 may include numerous specialized components configured to optimize the speed of rendering graphics output. For example, the GPU 200 may include specialized components for rendering three-dimensional models, for applying textures to surfaces, etc. For the sake of illustration, however, only a limited selection of components is shown in the example GPU 200 of FIG. 3. It is contemplated that GPU architectures other than the example architecture of FIG. 3 may be usable for implementing the techniques described herein. The GPU 200 may implement one or more application programmer interfaces (APIs) that permit programmers to invoke the functionality of the GPU. Suitable GPUs may be commercially available from vendors such as NVIDIA Corporation, ATI Technologies, and others.

The GPU 200 may include a host interface 260 configured to communicate with a data source 280 (e.g., a communications bus and/or processor(s) 910 of a host computer system 900). For example, the data source 280 may provide video input data 285 and/or executable program code to the GPU 200. In some embodiments, the host interface 260 may permit the movement of data in both directions between the GPU 200 and the data source 280. The GPU 200 may also include a display interface 270 for providing output data to a data target 290. The data target 290 may comprise an imaging device 952 such as a display or printer. For example, if data target 290 comprises a display device 952, the GPU 200 (along with other graphics components and/or interfaces 956) may "drive" the display 952 by providing graphics data at a particular rate from a screen buffer (e.g., the buffer 250).

In one embodiment, the GPU 200 may include internal memory 210. The GPU memory 210, also referred to herein as "video memory" or "VRAM," may comprise random-access memory (RAM) which is accessible to other GPU components. As will be described in greater detail below, the GPU memory 210 may be used in some embodiments to store various types of data and instructions such as input data, output data, intermediate data, program instructions for performing various tasks, etc. In one embodiment, the GPU 200 may also be configured to access a memory 920 of a host computer system 900 via the host interface 260.

In one embodiment, program instructions 940 may be stored in the memory 920 of the host computer system 900 and executed by the host computer system 900 to perform aspects of the time-based video degradation techniques discussed herein. For example, the host computer system 900 may send video input 285 (e.g., comprising one or more frames 111 and one or more images 112) to the GPU 200.

In one embodiment, the GPU 200 may include GPU program code 220 that is executable by the GPU 200 to perform aspects of the time-based video degradation techniques discussed herein. For example, elements of the video input 285 may be rasterized to pixels during a rendering process including execution of the GPU program code 220 on the GPU 200. Elements of the GPU program code 220 may be provided to the GPU 200 by a host computer system (e.g., the data source 280) and/or may be native to the GPU 200. The GPU program code 220 may comprise a vertex shader 221 and/or a pixel shader 222. A vertex shader 221 comprises program instructions that are executable by the GPU 200 to determine properties (e.g., position) of a particular vertex. A vertex shader 221 may expect input such as uniform variables (e.g., constant values for each invocation of the vertex shader) and vertex attributes (e.g., per-vertex data). A pixel shader 222 comprises program instructions that are executable by the GPU 200 to determine properties (e.g., color) of a particular pixel. A pixel shader 222 may also be referred to as a fragment shader. A pixel shader 222 may expect input such as uniform variables (e.g., constant values for each invocation of the pixel shader) and pixel attributes (e.g., per-pixel data). In generating the video output 295, the vertex shader 221 and/or the pixel shader 222 may be executed at various points in the graphics pipeline.

The GPU memory 200 may comprise one or more buffers 250. Each buffer 250 may comprise a two-dimensional array of pixel data (e.g., color values) and/or pixel metadata (e.g., depth values, stencil values, etc.). For example, the GPU memory 210 may comprise an image buffer 250 that stores intermediate or final pixel values generated in the rendering process. In one embodiment, the image buffer 250 may comprise a single-sampling buffer wherein each pixel in the buffer is represented by a single set of color and alpha values (e.g., one color value for a red channel, one color value for a green channel, one color value for a blue channel, and appropriate values for a one or more alpha channels). In one embodiment, the image buffer 250 may comprise a multi-sampling buffer usable for anti-aliasing.

As indicated above, time-based image degradation functionality 140 may be used to provide images of less than full resolution to a GPU 200 in order to provide fluid user interaction with a digital video editing program 100. A downsampling factor may be determined for the frames 111 in the video 110. In rendering an image within a frame using the downsampling factor d, the dimensions of an image may be multiplied by 1/d (i.e., the multiplicative inverse of the downsampling factor). Thus, for a downsampling factor of 2, both the x and y dimensions of an image may be divided by 2, and the resulting degraded image may be approximately one-fourth the size in pixels of the original image. In one embodiment, for a downsampling factor d, a downsampled image may be generated using every dth pixel from each column of every dth row. In one embodiment, edge pixels may not be included in the downsampled images.

At the start of the scrub, the downsampling factor may be set to 1. The downsampling factor may be maintained from one frame to the next unless a frame fails to be rendered within a pre-determined time (e.g., as indicated by a per-frame rendering time threshold value). Rendering a frame may comprise applying effects to each image, positioning the images within the frame, and composite the images onto a background plate. In one embodiment, the time threshold may be set to a suitable value such as 0.2 seconds per frame. The time threshold value may be a default value. The time threshold may be modifiable by a user (e.g., through an appropriate user interface or through changing a preferences file used by the digital video editing program 100). When the time threshold is exceeded for a frame, the downsampling factor may then be increased until a frame can be rendered within a time not exceeding the time threshold. In one embodiment, every image in a particular frame may be downsampled by the same downsampling factor; thus, when the time threshold is exceeded, the images already rendered for the frame may be discarded and the rendering may restart from the first image in the frame at the new downsampling factor. Once an acceptable downsampling factor is reached, the new downsampling factor may then be maintained from frame to frame unless the rendering of a subsequent frame exceeds the time threshold, in which case the downsampling factor may be increased again and propagated to subsequent frames. In one embodiment, the downsampling factor may be capped at a suitable maximum value such as 8.

The downsampling factor may thus be increased, thereby decreasing the resolution of images in the frame, if an attempt to render a frame exceeds the time threshold. In one embodiment, the downsampling factor may only be increased in this manner, but not decreased, from frame to frame during a scrub. In another embodiment, the downsampling factor during the rendering of a subsequent frame in a scrub may be decreased, thereby increasing the resolution of images within the frame, if the time to render a frame is sufficiently fast (i.e., less than a second threshold).

In one embodiment, the rendering of a particular frame may not be interrupted if the time threshold is exceeded. However, the downsampling factor may be increased for the next frame in the scrub. The downsampling factor may be decreased for each subsequent frame in response to the time threshold being exceeded for the previous frame until an acceptable downsampling factor is found.

A scrubbing operation may typically involve mouse moves or other appropriate user interactions with a user interface device. In one embodiment, if the mouse is moving faster than downsampled images can be generated at a maximum downsampling factor, then the rendering may be attempted for the frame at the time suggested by the current time needle of the digital video editing program 100. The mouse movement may exceed a particular magnitude (e.g., greater than 1 pixel) before rendering is interrupted.

In one embodiment, the downsampling may be performed on the host system 900 (e.g., in system memory 920). In one embodiment, the downsampling may be performed on the host system with no filtering. The downsampled images may be sent to the GPU 200 as textures and stored in video memory 210 so that scrubbing back over the images requires no additional transfer costs from the host system 900 to the video memory 210. The images may be stored with appropriate size tags (e.g., the associated downsampling factor) in the video memory 210. A stored downsampled image may also be re-used in the rendering of a subsequent frame that uses the same image or a similar image. For a downsampled image, a rectangle of the original (i.e., full) image size may be rendered with the smaller, downsampled texture using the GPU. The resulting pixilated image may be rendered using a built-in bilinear filter of the GPU to maximize the quality of the downsampled image. In one embodiment, the OpenGL API may be used to invoke the functionality of the GPU in rendering the video 110.

Figure 4:
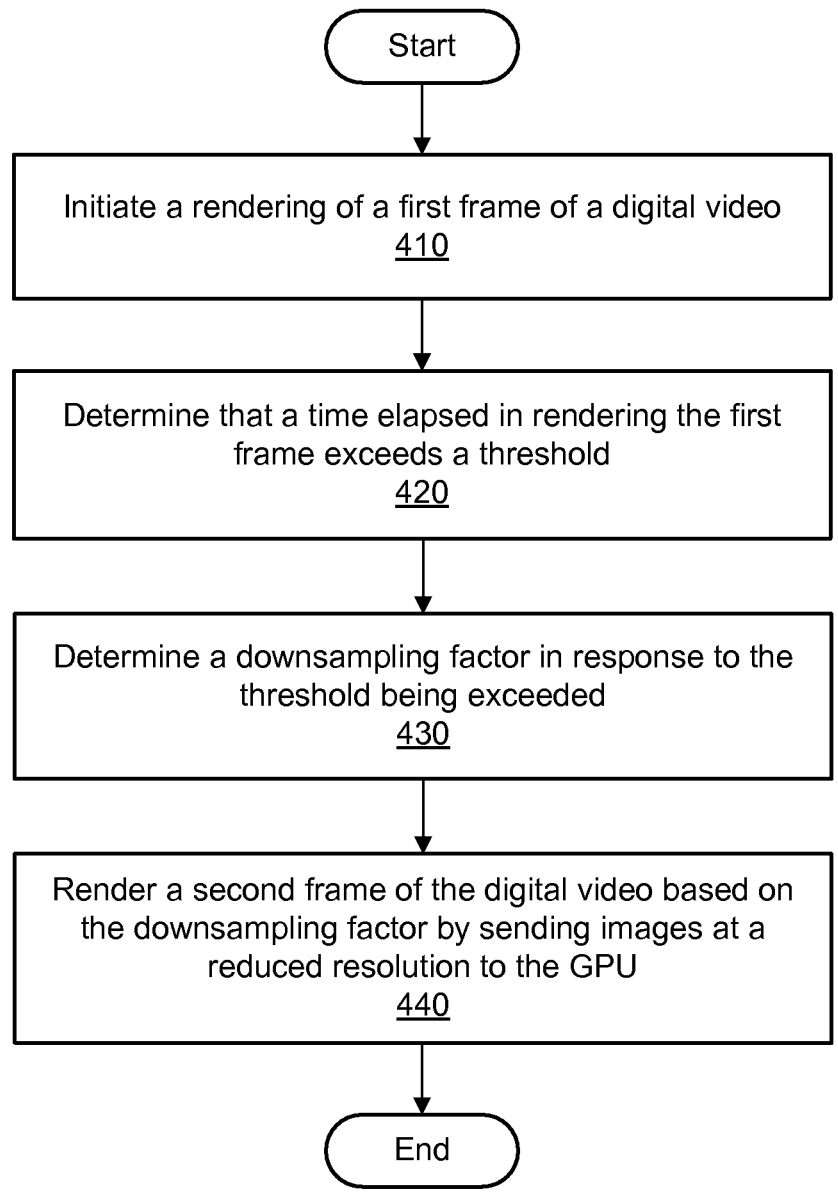
FIG. 4 is a flowchart illustrating a method for time-based degradation of images according to one embodiment.

FIG. 4 is a flowchart illustrating a method for time-based degradation of images according to one embodiment. As shown in 410, the rendering of a first frame of a digital video may be initiated. The rendering may use a GPU. The first frame may comprise a first set of one or more images. As shown in 420, it may be determined that a time elapsed in rendering the first frame exceeds a threshold. In one embodiment, the rendering of the first frame of the digital video may be interrupted in response to determining that the time elapsed in rendering the first frame exceeds the threshold. As shown in 430, a downsampling factor may be determined in response to determining that the time elapsed in rendering the first frame exceeds the threshold.

As shown in 440, a second frame of the digital video may be rendered based on the downsampling factor using the GPU. The second frame may comprise a second set of one or more images, and each of the second set of one or more images may have a respective original resolution. Rendering the second frame of the digital video based on the downsampling factor may comprise sending each of the second set of one or more images to the GPU at a reduced resolution. The reduced resolution may comprise the respective original resolution for each image divided by the downsampling factor. In one embodiment, the first frame of the digital video may be rendered similarly at the downsampling factor prior to rendering the second frame. In one embodiment, each of the second set of one or more images may be stored at the reduced resolution in a memory of the GPU. The stored images may be retrieved from the memory of the GPU in response to receiving an instruction to redisplay the second frame of the digital video.

As described above, the rendering of a frame may be interrupted if the rendering exceeds a time threshold. In one embodiment, however, some rendering operations using the GPU may not be interruptible. Thus, the rendering using the GPU (e.g., via OpenGL) may be divided into multiple passes. In a first pass, the rendering may attempt to load each image or layer into the video memory and apply effects. In a second pass, compositing shaders may be loaded. In a third pass, all the images stored on the GPU may be transformed and displayed. Between any of the passes, the elapsed time may be tested against the time threshold.

Figure 5A:
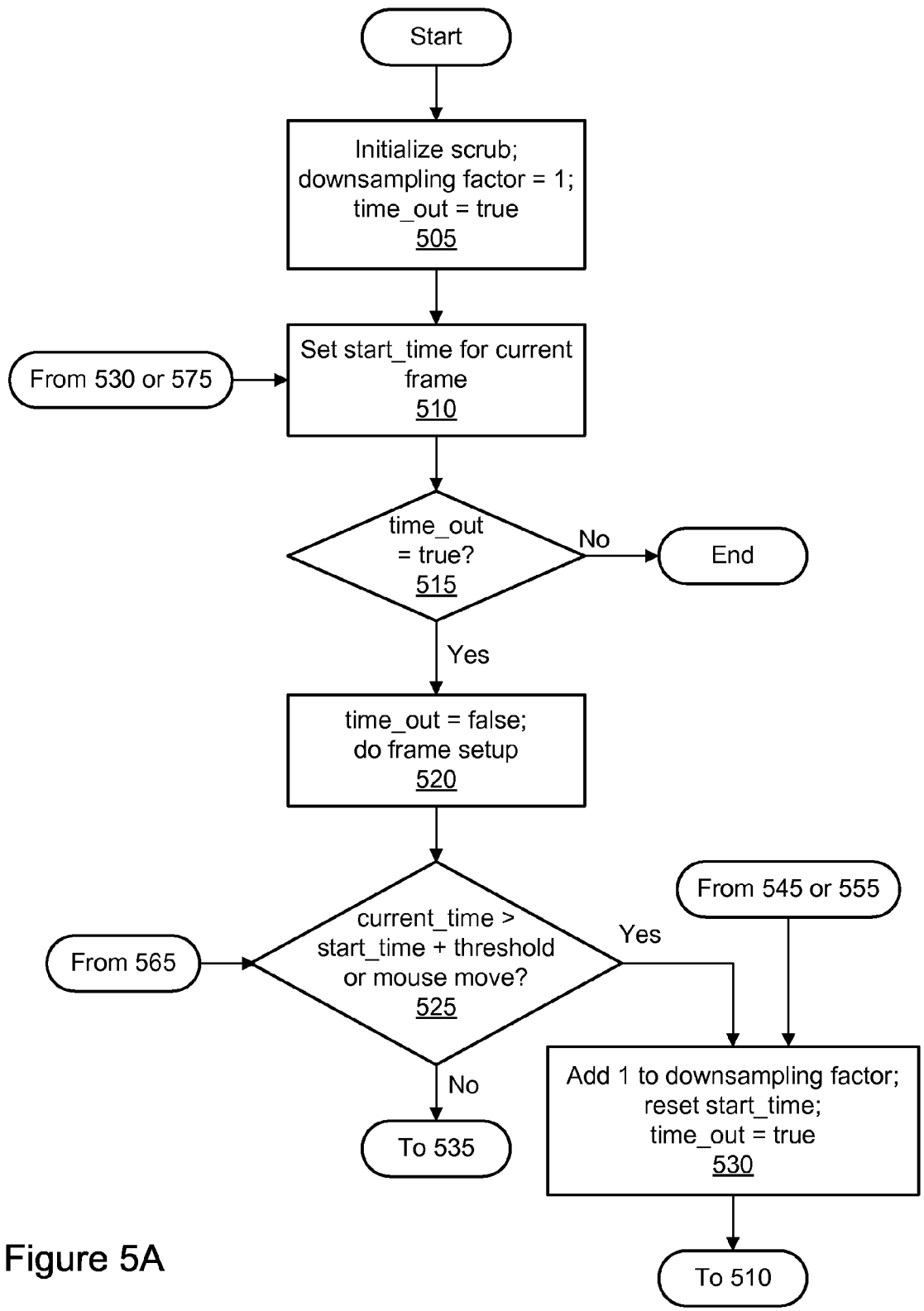
FIGS. 5A and 5B are flowcharts illustrating further aspects of a method for time-based degradation of images according to one embodiment.
Figure 5B:
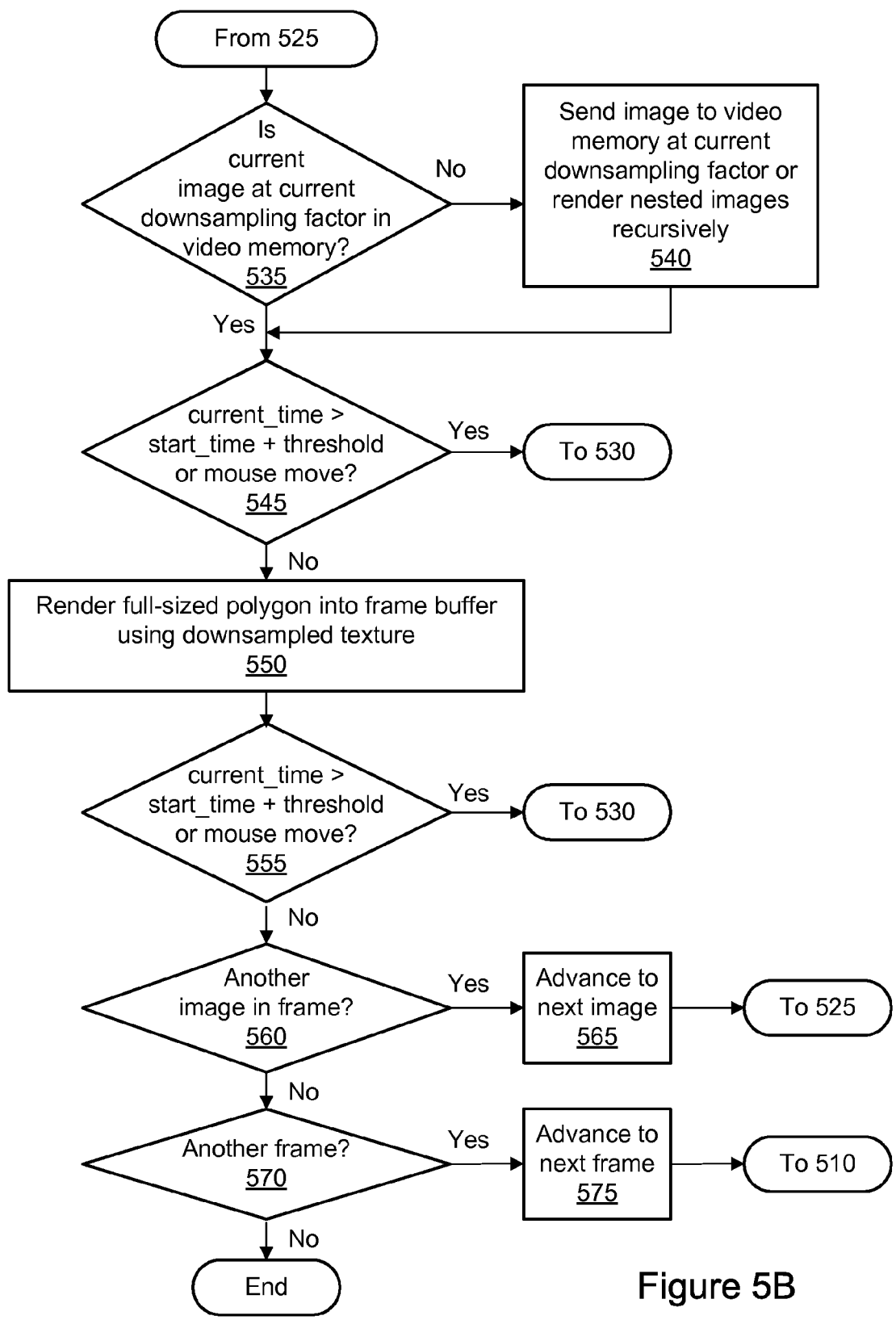

FIGS. 5A and 5B are flowcharts illustrating further aspects of a method for time-based degradation of images according to one embodiment. The method illustrated in FIGS. 5A and 5B may be performed upon the user commencing a scrub operation. As shown in 505, various initialization operations for the scrub may be performed. For example, the downsampling factor d may be set to 1. If the dimensions of an image are multiplied by 1/d (i.e., the multiplicative inverse of the downsampling factor) in rendering an image, then an initial setting of d=1 may result in images being rendered at their full resolution. In the initialization step shown in 505, the start time and interrupt threshold time may also be set. In one embodiment, a time_out value may also be set to "true."

Each frame in the scrub may be rendered as shown in 510 through 570. As shown in 510, the start time for the current frame may be set (e.g., initialized). Additionally, the current downsampling factor may be retrieved. As discussed above, the downsampling factor determined for the previous frame may be maintained to subsequent frames. As indicated previously in 505, the initial downsampling factor for the first frame in a scrub may be 1. As shown in 515, the scrub may end if the time_out value is not true. As shown in 520, the time_out value may be set to "false" prior to the rendering of the current frame. Additionally, one or more operations in a frame setup may be performed, as also shown in 520. For example, the frame setup may comprise clearing the frame buffer so that all images in the frame are rendered at the same downsampling factor.

Each image in the current frame may then be rendered unless a timeout exception is thrown (e.g., if the current time exceeds the start time and the threshold or if a mouse movement is detected). As shown in 525, a timeout exception may be thrown if the current time (i.e., the elapsed rendering time for the frame) exceeds the start time plus the threshold or if a mouse movement of sufficient magnitude is detected. As shown in 530, to handle the timeout exception, the downsampling factor may be increased by 1, the start time may be reset, and the time_out variable may be set to "true." In one embodiment, the timeout exception may be thrown if the current time exceeds the start time and the threshold upon setting up the rendering of the frame but before rendering any individual images.

As shown in 535, a determination may be made as to whether the current image at the current downsampling factor is in the video memory. If not, then in one embodiment, as shown in 540, the current image may be uploaded to a texture in the video memory at the current downsampling rate. In another embodiment, nested images may be rendered recursively (e.g., as one or more framebuffer objects), as will be discussed in greater detail below. As shown in 545, a timeout exception may be thrown if the current time (i.e., the elapsed rendering time for the frame) exceeds the start time and the threshold or if a mouse movement is detected. As shown in 550, a full-sized polygon may be rendered into the frame buffer of the GPU using the downsampled texture for the current image. As shown in 555, a timeout exception may be thrown if the current time (i.e., the elapsed rendering time for the frame) exceeds the start time and the threshold or if a mouse movement is detected. In this manner, the rendering of a frame may start over at the first image of the frame if the time to render any image in the frame exceeds the threshold.

As shown in 560, it may be determined whether additional images in the frame remain to be rendered. If so, then as shown in 565, the rendering may advance to the next image. As shown in 570, it may be determined whether additional frames remain to be rendered. If so, then as shown in 575, the rendering may advance to the next frame.

In one embodiment, the time-based image degradation method illustrated in FIGS. 5A and 5B may be implemented according to the following pseudocode:

```
ScrubVideo( )
{
    downsampling factor d = 1
    set start_time
    set interrupt threshold time
    for each frame in the scrub {
        set start_time
```

```
    get current downsampling factor d
    do {
        time_out = false;
        try {
            do frame setup
            if current_time > start_time + threshold,
            throw timeout exception
            for each image {
                if image at d is not in video memory {
                    upload image at d to a texture in video memory
                }
                if current_time > start_time + threshold, or mouse move,
throw timeout exception
                render full sized polygon into framebuffer using downsampled
texture
                if current_time > start_time + threshold, or mouse move
throw timeout exception
            }
        } catch (timeout exception) {
            increment d
            reset start_time
            time_out = true
        } end_try
    } while time_out and d < max_downsampling
    }
}
```

In one embodiment, an image in a frame may comprise another image. In this manner, frames (also referred to as scenes) may include nested or recursive images. Such a frame may be represented using a tree. A leaf node in the tree may comprise a simple texture. An internal node in the tree may comprise a collection of nodes and images which are intended to be rendered together to produce an image. In one embodiment, a complex frame represented by such a tree may be rendered using the GPU 200.

In one embodiment, a stack of framebuffer objects may be used to render a frame represented as a tree. In OpenGL, a framebuffer object (FBO) comprises a construct that allows one to assign a texture (or image) to be written during a render. The framebuffer object may comprise a two-dimensional image. In one embodiment, the internal nodes (i.e., non-leaf nodes) may be rendered into a texture via a framebuffer object. The texture may then be used as a leaf node when rendering the frame using the GPU. The framebuffer objects may be stored in the memory of the GPU for inexpensive reuse and redisplay.

In one embodiment, the framebuffer objects may be downsampled using the techniques discussed above. For example, a first image in a frame may be nested within a second image in the frame. If the first image comprises a first original resolution and the second image comprises a second original resolution, then rendering the frame using the GPU may comprise sending the first image to the GPU at a reduced resolution comprising the first original resolution divided by the downsampling factor. Similarly, the second image may be sent to the GPU at a reduced resolution comprising the second original resolution divided by the downsampling factor. The first and second downsampled images may be stored on the GPU (e.g., as two framebuffer objects). The downsampling factor may be stored with the nested images on the GPU.

In one embodiment, the rendering of a frame comprising recursive images may be implemented according to the following pseudocode:

```
RenderFrame(Scene *pScene)
{
    FrameBuffer *pFBO = new FrameBuffer
    RenderScene(pScene, pFBO);
    RenderToScreen(pFBO);
    dispose pFBO;
}
```

In one embodiment, further aspects of the rendering of a frame comprising recursive images may be implemented according to the following pseudocode:

```
RenderScene( Scene *pScene, Framebuffer *pFBO)
{
    for each image, pImage, in the scene {
        if the image is a leaf {
            RenderToFramebuffer(pImage, pFBO)
        } else {
            extract scene information from the internal node
            Push FBO Stack
            FrameBuffer *pSubFrameBuffer = new FrameBuffer
            Scene *pSubScene = new Scene(scene_info);
            RenderScene(pSubScene, pSubFrameBuffer);
            dispose pSubScene;
            dispose pSubFrameBuffer;
            Pop FBO stack
        }
    }
}
```

In one embodiment, yet further aspects of the rendering of a frame comprising recursive images may be implemented according to the following pseudocode:

```
RenderToFramebuffer(Image *pImage, Framebuffer *pFramebuffer)
{
    set up fragment shaders
    transform and composite image
}
```

FIG. 6 is a block diagram illustrating constituent elements of a computer system 900 that is configured to implement embodiments of the systems and methods described herein. The computer system 900 may include one or more processors 910 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 900, such as various versions of Unix, Linux, Windows® from Microsoft Corporation, MacOS® from Apple Inc., or any other operating system that enables the operation of software on a hardware platform. The processor(s) 910 may be coupled to one or more of the other illustrated components, such as a memory 920, by at least one communications bus.

In one embodiment, a specialized graphics card or other graphics component 956 may be coupled to the processor(s) 910. The graphics component 956 may include a graphics processing unit (GPU) 200. Additionally, the computer system 900 may include one or more imaging devices 952. The one or more imaging devices 952 may include various types of raster-based imaging devices such as monitors and printers. In one embodiment, one or more display devices 952 may be coupled to the graphics component 956 for display of data provided by the graphics component 956.

In one embodiment, program instructions 940 that may be executable by the processor(s) 910 to implement aspects of the techniques described herein may be partly or fully resident within the memory 920 at the computer system 900 at any point in time. The memory 920 may be implemented using any appropriate medium such as any of various types of ROM or RAM (e.g., DRAM, SDRAM, RDRAM, SRAM, etc.), or combinations thereof. The program instructions may also be stored on a storage device 960 accessible from the processor(s) 910. Any of a variety of storage devices 960 may be used to store the program instructions 940 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 960 may be coupled to the processor(s) 910 through one or more storage or I/O interfaces. In some embodiments, the program instructions 940 may be provided to the computer system 900 via any suitable computer-readable storage medium including the memory 920 and storage devices 960 described above.

The computer system 900 may also include one or more additional I/O interfaces, such as interfaces for one or more user input devices 950. In addition, the computer system 900 may include one or more network interfaces 954 providing access to a network. It should be noted that one or more components of the computer system 900 may be located remotely and accessed via the network. The program instructions may be implemented in various embodiments using any desired programming language, scripting language, or combination of programming languages and/or scripting languages, e.g., C, C++, C#, Java™, Perl, etc. The computer system 900 may also include numerous elements not shown in FIG. 6, as illustrated by the ellipsis.

In various embodiments, the elements shown in FIGS. 4, 5A, and 5B may be performed in a different order than the illustrated order. In FIGS. 4, 5A, and 5B, any of the operations described in the elements may be performed programmatically (i.e., by a computer according to a computer program). In FIGS. 4, 5A, and 5B, any of the operations described in the elements may be performed automatically (i.e., without user intervention).

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
    initiating a rendering of a first frame of a digital video using a graphics processing unit (GPU), wherein the first frame comprises a first set of one or more images;
    measuring a time elapsed in rendering the first frame;
    automatically determining that the time elapsed in rendering the first frame exceeds a pre-determined threshold, wherein the pre-determined threshold comprises a duration of time;
    determining a downsampling factor in response to determining that the time elapsed in rendering the first frame exceeds the pre-determined threshold; and
    rendering a second frame of the digital video based on the downsampling factor using the GPU, wherein the second frame comprises a second set of one or more images, wherein each of the second set of one or more images has a respective original resolution, wherein rendering the second frame of the digital video based on the downsampling factor using the GPU comprises sending each of the second set of one or more images to the GPU at a reduced resolution comprising the respective original resolution divided by the downsampling factor.

2. The method as recited in claim 1, further comprising:
    rendering the first frame of the digital video based on the downsampling factor using the GPU, wherein each of the first set of one or more images has a respective original resolution, wherein rendering the first frame of the digital video based on the downsampling factor using the GPU comprises sending each of the first set of one or more images to the GPU at a reduced resolution comprising the respective original resolution divided by the downsampling factor.

3. The method as recited in claim 1, further comprising:
    interrupting the rendering of the first frame of the digital video using the GPU in response to determining that the time elapsed in rendering the first frame exceeds the pre-determined threshold.

4. The method as recited in claim 1, wherein the rendering of the first frame of the digital video is initiated based on an initial downsampling factor, and wherein determining the downsampling factor comprises increasing the initial downsampling factor.

5. The method as recited in claim 1, further comprising:
    initiating a rendering of a third frame of the digital video using the GPU, wherein the third frame comprises a third set of one or more images, wherein each of the third set of one or more images has a respective original resolution;
    determining that a time elapsed in rendering the third frame exceeds the pre-determined threshold;
    determining a second downsampling factor in response to determining that the time elapsed in rendering the third frame exceeds the pre-determined threshold, wherein the second downsampling factor is larger than the downsampling factor; and
    rendering the third frame of the digital video based on the second downsampling factor using the GPU, comprising sending each of the third set of one or more images to the GPU at a further reduced resolution comprising the respective original resolution divided by the second downsampling factor.

6. The method as recited in claim 1, further comprising:
    storing each of the second set of one or more images at the reduced resolution in a memory of the GPU;
    receiving an instruction to redisplay the second frame of the digital video; and
    retrieving the second set of one or more images from the memory of the GPU in response to receiving the instruction to redisplay the second frame of the digital video.

7. The method as recited in claim 1, further comprising:
    receiving mouse input from a user; and
    interrupting the rendering of the first frame of the digital video in response to receiving the mouse input from the user.

8. The method as recited in claim 1, wherein a first image of the second set of one or more images is nested within a second image of the second set of one or more images, wherein the first image comprises a first original resolution, wherein the second image comprises a second original resolution, and wherein rendering the second frame of the digital video based on the downsampling factor using the GPU comprises sending the first image to the GPU at a reduced resolution comprising the first original resolution divided by the downsampling factor and sending the second image to the GPU at a reduced resolution comprising the second original resolution divided by the downsampling factor.

9. The method as recited in claim 8, wherein the first image is stored in a memory of the GPU as a first framebuffer object, and wherein the second image is stored in the memory of the GPU as a second framebuffer object.

10. A computer-implemented method, comprising:
rendering a first set of one or more images using a graphics processing unit (GPU), wherein the first set of one or more images are reduced in resolution by a first downsampling factor;
measuring a time elapsed in rendering the first set of one or more images;
automatically determining that the time elapsed in rendering the first set of one or more images exceeds a pre-determined threshold, wherein the pre-determined threshold comprises a duration of time; and
rendering a second set of one or more images using the GPU subsequent to rendering the first set of one or more images, wherein the second set of one or more images are reduced in resolution by a second downsampling factor, wherein the second downsampling factor is greater than the first downsampling factor.

11. A computer-readable storage device, storing program instructions, wherein the program instructions are computer-executable to implement:
initiating a rendering of a first frame of a digital video using a graphics processing unit (GPU), wherein the first frame comprises a first set of one or more images;
measuring a time elapsed in rendering the first frame;
automatically determining that the time elapsed in rendering the first frame exceeds a pre-determined threshold, wherein the pre-determined threshold comprises a duration of time;
determining a downsampling factor in response to determining that the time elapsed in rendering the first frame exceeds the pre-determined threshold; and
rendering a second frame of the digital video based on the downsampling factor using the GPU, wherein the second frame comprises a second set of one or more images, wherein each of the second set of one or more images has a respective original resolution, wherein rendering the second frame of the digital video based on the downsampling factor using the GPU comprises sending each of the second set of one or more images to the GPU at a reduced resolution comprising the respective original resolution divided by the downsampling factor.

12. The computer-readable storage device as recited in claim 11, wherein the program instructions are further computer-executable to implement:
rendering the first frame of the digital video based on the downsampling factor using the GPU, wherein each of the first set of one or more images has a respective original resolution, wherein rendering the first frame of the digital video based on the downsampling factor using the GPU comprises sending each of the first set of one or more images to the GPU at a reduced resolution comprising the respective original resolution divided by the downsampling factor.

13. The computer-readable storage device as recited in claim 11, wherein the program instructions are further computer-executable to implement:
interrupting the rendering of the first frame of the digital video using the GPU in response to determining that the time elapsed in rendering the first frame exceeds the pre-determined threshold.

14. The computer-readable storage device as recited in claim 11, wherein the rendering of the first frame of the digital video is initiated based on an initial downsampling factor, and wherein determining the downsampling factor comprises increasing the initial downsampling factor.

15. The computer-readable storage device as recited in claim 11, wherein the program instructions are further computer-executable to implement:
initiating a rendering of a third frame of the digital video using the GPU, wherein the third frame comprises a third set of one or more images, wherein each of the third set of one or more images has a respective original resolution;
determining that a time elapsed in rendering the third frame exceeds the pre-determined threshold;
determining a second downsampling factor in response to determining that the time elapsed in rendering the third frame exceeds the pre-determined threshold, wherein the second downsampling factor is larger than the downsampling factor; and
rendering the third frame of the digital video based on the second downsampling factor using the GPU, comprising sending each of the third set of one or more images to the GPU at a further reduced resolution comprising the respective original resolution divided by the second downsampling factor.

16. The computer-readable storage device as recited in claim 11, wherein the program instructions are further computer-executable to implement:
storing each of the second set of one or more images at the reduced resolution in a memory of the GPU;
receiving an instruction to redisplay the second frame of the digital video; and
retrieving the second set of one or more images from the memory of the GPU in response to receiving the instruction to redisplay the second frame of the digital video.

17. The computer-readable storage device as recited in claim 11, wherein the program instructions are further computer-executable to implement:
receiving mouse input from a user; and
interrupting the rendering of the first frame of the digital video in response to receiving the mouse input from the user.

18. The computer-readable storage device as recited in claim 11, wherein a first image of the second set of one or more images is nested within a second image of the second set of one or more images, wherein the first image comprises a first original resolution, wherein the second image comprises a second original resolution, and wherein rendering the second frame of the digital video based on the downsampling factor using the GPU comprises sending the first image to the GPU at a reduced resolution comprising the first original resolution divided by the downsampling factor and sending the second image to the GPU at a reduced resolution comprising the second original resolution divided by the downsampling factor.

19. The computer-readable storage device as recited in claim 18, wherein the first image is stored in a memory of the GPU as a first framebuffer object, and wherein the second image is stored in the memory of the GPU as a second framebuffer object.

20. A computer-readable storage device, storing program instructions, wherein the program instructions are computer-executable to implement:
rendering a first set of one or more images using a graphics processing unit (GPU), wherein the first set of one or more images are reduced in resolution by a first downsampling factor;
measuring a time elapsed in rendering the first set of one or more images;
automatically determining that the time elapsed in rendering the first set of one or more images exceeds a pre-determined threshold, wherein the pre-determined threshold comprises a duration of time; and rendering a second set of one or more images using the GPU subsequent to rendering the first set of one or more images, wherein the second set of one or more images are reduced in resolution by a second downsampling factor, wherein the second downsampling factor is greater than the first downsampling factor.

21. A system, comprising:

at least one processor;

a graphics processing unit (GPU) coupled to the at least one processor; and a memory coupled to the at least one processor, wherein the memory stores program instructions, wherein the program instructions are executable by the at least one processor to:

initiate a rendering of a first frame of a digital video, wherein the first frame comprises a first set of one or more images;

measure a time elapsed in rendering the first frame;

automatically determine that the time elapsed in rendering the first frame exceeds a pre-determined threshold, wherein the pre-determined threshold comprises a duration of time;

determine a downsampling factor in response to determining that the time elapsed in rendering the first frame exceeds the pre-determined threshold; and render a second frame of the digital video based on the downsampling factor, wherein the second frame comprises a second set of one or more images, wherein each of the second set of one or more images has a respective original resolution, wherein rendering the second frame of the digital video based on the downsampling factor comprises sending each of the second set of one or more images to the GPU at a reduced resolution comprising the respective original resolution divided by the downsampling factor.

22. The system as recited in claim 21, wherein the program instructions are further executable by the at least one processor to:

render the first frame of the digital video based on the downsampling factor, wherein each of the first set of one or more images has a respective original resolution, wherein rendering the first frame of the digital video based on the downsampling factor comprises sending each of the first set of one or more images to the GPU at a reduced resolution comprising the respective original resolution divided by the downsampling factor.

23. The system as recited in claim 21, wherein the program instructions are further executable by the at least one processor to:

interrupt the rendering of the first frame of the digital video in response to determining that the time elapsed in rendering the first frame exceeds the pre-determined threshold.

24. The system as recited in claim 21, wherein the rendering of the first frame of the digital video is initiated based on an initial downsampling factor, and wherein determining the downsampling factor comprises increasing the initial downsampling factor.

25. The system as recited in claim 21, wherein the program instructions are further executable by the at least one processor to:

initiate a rendering of a third frame of the digital video, wherein the third frame comprises a third set of one or more images, wherein each of the third set of one or more images has a respective original resolution;

determine that a time elapsed in rendering the third frame exceeds the pre-determined threshold;

determine a second downsampling factor in response to determining that the time elapsed in rendering the third frame exceeds the pre-determined threshold, wherein the second downsampling factor is larger than the downsampling factor; and render the third frame of the digital video based on the second downsampling factor, comprising sending each of the third set of one or more images to the GPU at a further reduced resolution comprising the respective original resolution divided by the second downsampling factor.

26. The system as recited in claim 21, wherein the program instructions are further executable by the at least one processor to:

store each of the second set of one or more images at the reduced resolution in a memory of the GPU;

receive an instruction to redisplay the second frame of the digital video; and retrieve the second set of one or more images from the memory of the GPU in response to receiving the instruction to redisplay the second frame of the digital video.

27. The system as recited in claim 21, wherein the program instructions are further executable by the at least one processor to:

receive mouse input from a user; and interrupt the rendering of the first frame of the digital video in response to receiving the mouse input from the user.

28. The system as recited in claim 21, wherein a first image of the second set of one or more images is nested within a second image of the second set of one or more images, wherein the first image comprises a first original resolution, wherein the second image comprises a second original resolution, and wherein rendering the second frame of the digital video based on the downsampling factor comprises sending the first image to the GPU at a reduced resolution comprising the first original resolution divided by the downsampling factor and sending the second image to the GPU at a reduced resolution comprising the second original resolution divided by the downsampling factor.

29. The system as recited in claim 28, wherein the first image is stored in a memory of the GPU as a first framebuffer object, and wherein the second image is stored in the memory of the GPU as a second framebuffer object.

30. A system, comprising:

at least one processor;

a graphics processing unit (GPU) coupled to the at least one processor and comprising a graphics memory; and a memory coupled to the at least one processor, wherein the memory stores program instructions, wherein the program instructions are executable by the at least one processor to:

render a first set of one or more images, wherein the first set of one or more images are reduced in resolution by a first downsampling factor and stored in the graphics memory;

measure a time elapsed in rendering the first set of one or more images;

automatically determine that the time elapsed in rendering the first set of one or more images exceeds a pre-determined threshold, wherein the pre-determined threshold comprises a duration of time;

render a second set of one or more images subsequent to rendering the first set of one or more images, wherein the second set of one or more images are reduced in resolution by a second downsampling factor and stored in the graphics memory, wherein the second downsampling factor is greater than the first downsampling factor.

\* \* \* \* \*